United States Patent [19]

Adler, Jr.

[11] 3,735,115

[45] May 22, 1973

[54] STREAMLINED GAS DISCHARGE ANTICOLLISION BEACON

[76] Inventor: Charles Adler, Jr., 1506 Sutton Place Apt., 1111 Park Avenue, Baltimore, Md. 21201

[22] Filed: Mar. 16, 1972

[21] Appl. No.: 235,436

[52] U.S. Cl. ................... 240/7.7, 240/51.12, 340/25
[51] Int. Cl. ............................................. B64d 47/02
[58] Field of Search .......................... 240/51.12, 7.7; 340/25

[56] References Cited

UNITED STATES PATENTS

| | | | |
|---|---|---|---|
| 1,817,268 | 8/1931 | Rohlfs | 240/7.7 X |
| 2,704,359 | 3/1955 | Barr | 340/25 |
| 2,916,610 | 12/1959 | Crossley | 340/25 X |
| 3,533,059 | 10/1970 | Lambert | 340/25 |

Primary Examiner—Samuel S. Matthews
Assistant Examiner—Michael D. Harris
Attorney—John W. Malley et al.

[57] ABSTRACT

A streamlined, gas discharge, anti-collision aircraft beacon for high speed aircraft which is adapted for mounting on an external portion of the aircraft, and which includes a generally inverted U-shaped gas discharge tube to provide light through 360° in a horizontal plane and 180° in a vertical plane. Two concave reflectors positioned concentrically with the horizontal elongated portion of the gas discharge tube so as to increase the intensity of light projected in the fore and aft directions of an airplane. An aerodynamically streamlined design light transmitting cover over the reflectors and gas discharge tube is provided to reduce aerodynamic drag on the aircraft.

6 Claims, 3 Drawing Figures

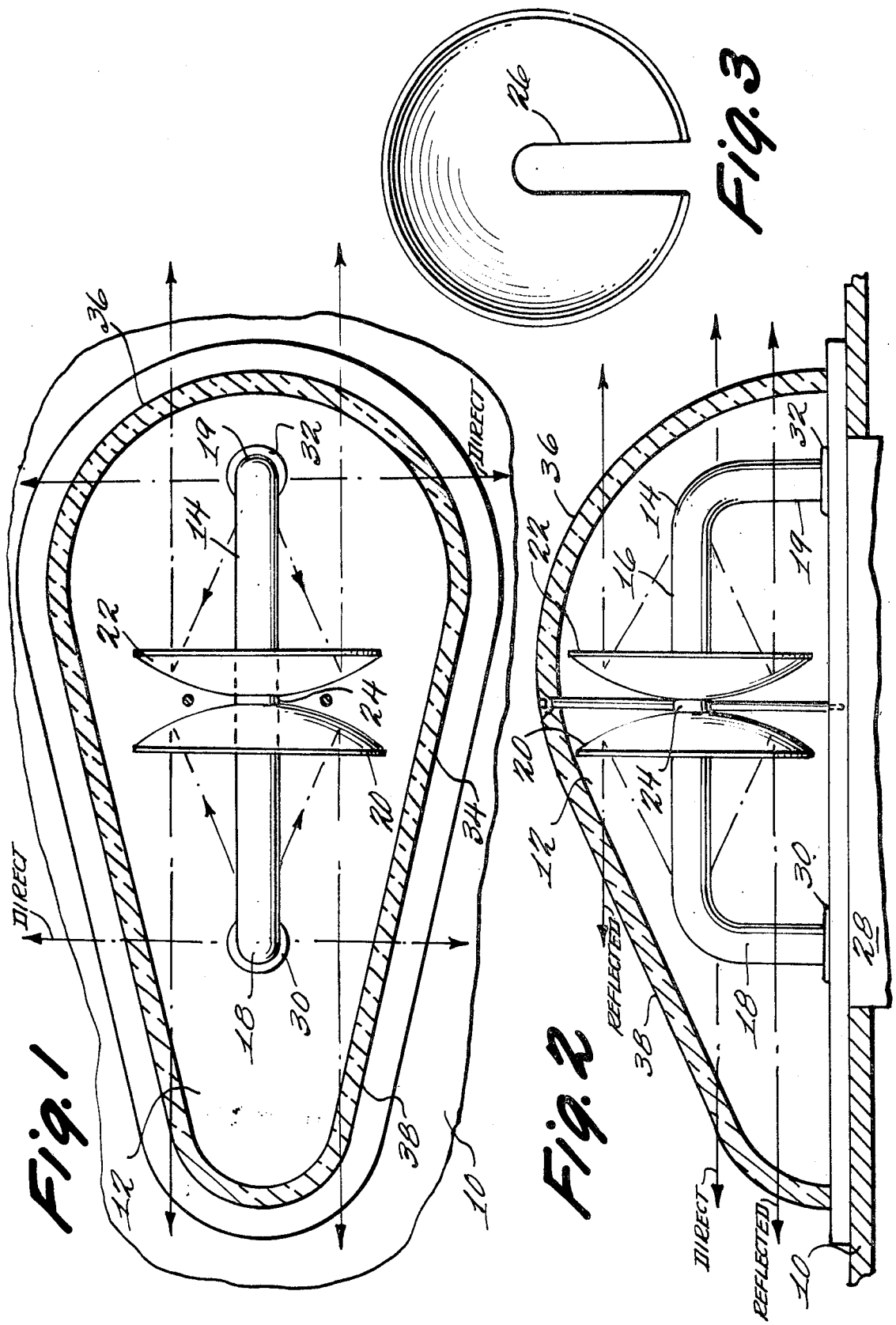

3,735,115

STREAMLINED GAS DISCHARGE ANTICOLLISION BEACON

BACKGROUND OF THE INVENTION

1. Field of the Invention

The present invention relates to aircraft anti-collision beacons and more particularly to the streamlined gas discharge anti-collision beacon for high-speed aircraft.

2. Prior Art

In the past it has been a common practice to employ incandescent lamps with a streamlined cover to provide running lights for aricraft. However, with the advent of high speed aircraft, the incandescent lamps proved to be undesirable since in order to give adequate warning of the presence of a high speed aircraft, the light intensity had to be increased, thus increasing the size of the incandescent lamps and their covers. The result was an increase in the aerodynamic drag on the aircraft due to the large size of the cover.

As a result xenon lights were employed which provided the increase in light intensity necessary for high speed aircraft but did not provide the necessary streamlined configuration so as to minimize aerodynamic drag. Furthermore, in addition to creating problems with respect to aerodynamic drag, the xenon lamps have been provided with circular flash tubes which do not provide the amount of light that is provided by the elongated gas tube and reflectors of this invention.

Although several designs have been employed to eliminate the undesirable features of aircraft anti-collision beacons as set out above, including my earlier U.S. Pat. No. 3,619,597, which has none of these disadvantages, there are additional more desirable features which are embodied in the present invention. Most of these previously mentioned designs do not provide a complete envelope of light from the horizontal base of the beacon nor do they provide as uniform a field of light through 360° in a horizontal plane as does the present invention.

SUMMARY OF THE INVENTION

The anti-collision aircraft beacon of this invention is intended to provide an envelope of high intensity light with increased intensity of projected light in the fore and aft directions of the airplane. A horizontally elongated portion of a gas discharge tube is provided to emit light in a semicylindrical pattern above the horizontal base of the assembly. Vertical portions of the gas discharge tube are provided to emit light in substantially the fore and aft directions of the beacon. Thus a complete envelope of light is provided. Two concave reflectors positioned concentrically with the horizontally disposed straight portion of the gas discharge tube are also provided. These reflectors increase the light being emitted from the beacon in the fore and aft directions due to the reflected light rays being combined with the direct light rays. Thus the approach of a high speed aircraft can be detected sooner since the light may be seen from a further distance. It is an additional important advantage of this invention that the light be reflected fore and aft because the silhouette of an airplane from these directions is the smallest and therefore it is from these directions that it is least likely to be seen.

The gas discharge tube and the reflectors are provided with a streamlined aerodynamic cover for minimizing aerodynamic drag. The ends of the gas discharge tube are adapted to be fastened to lighting circuitry for stroboscopically flashing said gas discharge tube. This flashing apparatus is attached below the anticollision beacon and positioned within the airplane.

The principles of the invention will be further hereinafter discussed with reference to the drawings wherein the preferred embodiments is shown. The specifics illustrated in the drawings are intended to exemplify rather than limit aspects of the invention as defined in the claims.

BRIEF DESCRIPTION OF THE DRAWINGS

In the drawings:

FIG. 1 is a top plan view of the preferred embodiment of the invention with a portion of the cover removed to show internal details of the invention;

FIG. 2 is a side elevation view of the preferred embodiment of the beacon with the light cover partially in section to provide a view of the internal details of the invention;

FIG. 3 is a front elevation view of a single reflector in its preferred embodiment.

DETAILED DESCRIPTION OF THE PREFERRED EMBODIMENTS

In FIG. 1, an exterior surface 10 of an aircraft is shown with an anti-collision beacon 12 attached thereto. The beacon includes a gas discharge tube 14 with a horizontally positioned straight portion 16 and two end portions 18 and 19 extending perpendicular to said horizontal straight portion and in a vertical plane aligned with the longitudinal axis of the aircraft. Reflectors 20 and 22 having internally concave reflecting surfaces and disposed in a spaced relation to each other so that light may be emitted from the central portion 24 of the gas discharge tube 14.

Reflectors 20 and 22 are provided with a slot 26 extending from their outer peripheral edges into their central region for mounting said reflectors on the gas discharge tube.

Lighting circuitry 28 is provided for stroboscopically flashing said gas discharge tubes, said tube being connected at the extremities 30 and 32 of its end portions 18 and 19 by conventional means.

Encompassing the light discharging portion of the beacon is a light transmitting cover 34 of generally a tear-drop shape having a front portion 36 which can be generally described as a portion of a sphere, the front portion blending into a rear portion 38 which can be generally described as a semiconically shaped portion. This cover 34 provides protection for the gas discharge tube 14 and the reflectors 20 and 22 and provides an aerodynamically satisfactory shape for reducing the aerodynamic drag on the airplane.

In the operation of the beacon of this invention the conventional flashing circuitry located beneath the external surface 10 of the aircraft is caused to excite the gas in the gas discharge tube. The excitation of the gas generates light in a known manner which provides a field which covers 360° from a horizontal plane and through 180° in a vertical plane. In addition to this, the reflectors 20 and 22 positioned with their focal points along the axis of the horizontally positioned straight portion of the gas discharge tube, increases the light observed in the fore and aft directions of the beacon.

As light is emitted from the gas discharge tube as shown in FIG. 2, direct light is observable fore and aft as well as in other planes. Additional light is reflected from the internal concave surface of the reflectors to produce an increased intensity of light in a fore and aft directions to provide a uniform field of light through 360° in a horizontal plane about the base of the beacon.

Several different shapes are suitable as internal concave surfaces of the reflectors, because many different shapes reflect light so as to increase intensity in a specific direction. By way of example, the more suitable internal surface configurations for the reflectors are parabolic, elliptical or spherical shapes. The parabolic and elliptical surfaces when used as reflectors provide the maximum intensity of light in a specific direction since light reflected from their focal point to the surface of the reflector assumes an angle of reflection which creates an essentially parallel light beam. The spherical reflector on the other hand, although increasing the intensity of light in the fore and aft directions when used as the internal surfaces of the reflector defined by this invention do not provide parallel light beams, but increase the field of cover of the light as well as magnifying its intensity.

Although the reflectors tend to decrease the amount of light available in the vertical plane because of the amount of light being reflected, the gas discharge tube is designed in such a manner as to provide a visible field of light from any position from which the beacon may be observed when attached to the aircraft. The preferred embodiment shows a separation between the two reflectors so as to provide a maximum intensity of light in a vertical plane directly above the beacon. This is not essential if the tube extends in the horizontal plane an adequate distance beyond the periphery of the reflector so as to provide a visible light source from the same vertical plane described above.

What is claimed is:

1. A streamlined, gas discharge, anti-collision aircraft beacon for mounting on an external portion of an aircraft comprising:

a gas discharge tube means for supplying a light field about the beacon, said gas discharge tube means having a generally horizontally disposed elongated portion;

two concave reflectors having inner concave reflective surfaces defining separate focal points, the reflectors opening toward opposite directions and being positioned so that said tube means pass through said focal points, a streamlined light transmitting cover over said reflectors and tube means having a generally teardrop configuration elongated in alignment with the tube means, lighting circuitry for stroboscopically flashing said gas discharge tube means.

2. An aircraft beacon as defined in claim 1 wherein said gas discharge tube means has end portions vertically disposed in a plane aligned with the elongation of the cover and having means at its extremities removably attached to said lighting circuitry.

3. An aircraft beacon as defined in claim 1 wherein said reflectors are disposed in a spaced relation to each other and have elongated slot means extending from their outer peripheral edges into their respective central region for permitting radial movement for installation and removal of said reflector from said tube means and for positioning said reflector so as to reflect light fore and aft of the beacon.

4. An aircraft beacon as defined in claim 3 wherein said reflectors have a parabolic-shaped reflecting surface.

5. An aircraft beacon as defined in claim 3 wherein said gas discharge tube means has end portions vertically disposed in a plane aligned with the elongation of the cover and having means at its extremities removably attached to said lighting circuitry.

6. An aircraft beacon as defined in claim 3 wherein said reflectors respectively have elliptical reflecting surfaces.

* * * * *